US012662772B2

(12) United States Patent
Vargas et al.

(10) Patent No.: US 12,662,772 B2
(45) Date of Patent: Jun. 23, 2026

(54) LAUNDRY APPLIANCE WITH HEAT PUMP HAVING IMPROVED EVAPORATOR EFFICIENCY

(71) Applicant: Whirlpool Corporation, Benton Harbor, MI (US)

(72) Inventors: Victor Jafet Vargas, Stevensville, MI (US); Mohsin M. Attar, Maharashtra (IN); Ajiket J. Patil, Maharashtra (IN); Shubham Phapale, Maharashtra (IN)

(73) Assignee: Whirlpool Corporation, Benton Harbor, MI (US)

( * ) Notice: Subject to any disclaimer, the term of this patent is extended or adjusted under 35 U.S.C. 154(b) by 455 days.

(21) Appl. No.: 18/216,241

(22) Filed: Jun. 29, 2023

(65) Prior Publication Data

US 2025/0003138 A1 Jan. 2, 2025

(51) Int. Cl.

| | |
|---|---|
| ***D06F 58/20*** | (2006.01) |
| ***B08B 7/02*** | (2006.01) |
| ***D06F 25/00*** | (2006.01) |
| ***D06F 58/02*** | (2006.01) |
| ***D06F 58/24*** | (2006.01) |

(52) U.S. Cl.

CPC .............. *D06F 58/206* (2013.01); *B08B 7/02* (2013.01); *D06F 25/00* (2013.01); *D06F 58/02* (2013.01); *D06F 58/24* (2013.01)

(58) Field of Classification Search

CPC ........ D06F 58/206; D06F 58/02; D06F 58/24; D06F 25/00; B08B 7/02

USPC .............................................. 34/73, 595–610

See application file for complete search history.

(56) References Cited

U.S. PATENT DOCUMENTS

| | | | | |
|---|---|---|---|---|
| 6,233,841 | B1 * | 5/2001 | Beach | A23B 2/97 34/418 |
| 8,572,865 | B2 * | 11/2013 | Beers | D06F 58/206 34/601 |
| 8,683,711 | B2 * | 4/2014 | Han | D06F 58/206 34/74 |
| 9,175,432 | B2 * | 11/2015 | Del Pos | D06F 39/125 |
| 9,212,441 | B2 * | 12/2015 | Bison | D06F 25/00 |
| 10,876,248 | B2 | 12/2020 | Kim et al. | |
| 10,988,894 | B2 * | 4/2021 | Kim | D06F 58/206 |
| 11,885,563 | B2 * | 1/2024 | Chudnovsky | D06F 58/26 |

(Continued)

FOREIGN PATENT DOCUMENTS

| | | | | |
|---|---|---|---|---|
| CN | 114592332 A | 6/2022 | | |
| EP | 2385163 A1 * | 11/2011 | | D06F 58/206 |

(Continued)

*Primary Examiner* — Stephen M Gravini

(74) *Attorney, Agent, or Firm* — Brooks Kushman P.C.

(57) ABSTRACT

A heat pump dryer includes a cabinet, a drum rotatably supported within the cabinet, a heat pump including a condenser and an evaporator that are arranged in fluid communication with each other and a floating base plate that is dynamically supported within the cabinet such that the floating base plate is permitted to oscillate relative to the cabinet. The vibration source and at least one of the evaporator and the condenser are mounted on the floating base plate such that operation of the vibration source causes the at least one of the evaporator and the condenser to vibrate and shake water condensate and debris from the at least one of the evaporator and the condenser for improved heat pump circuit efficiency.

29 Claims, 9 Drawing Sheets

(56) References Cited

U.S. PATENT DOCUMENTS

| | | | | |
|---|---|---|---|---|
| 12,000,073 | B2 * | 6/2024 | Kellow | D06F 33/60 |
| 12,152,335 | B2 * | 11/2024 | Bae | D06F 58/02 |
| 12,325,949 | B2 * | 6/2025 | Bae | D06F 58/24 |
| 12,467,179 | B2 * | 11/2025 | Masters, Jr. | D06F 58/26 |
| 2019/0106832 | A1 * | 4/2019 | Cagliani | D06F 25/00 |
| 2025/0003138 | A1 * | 1/2025 | Vargas | B08B 7/02 |

FOREIGN PATENT DOCUMENTS

| | | | | |
|---|---|---|---|---|
| EP | 3564428 | B1 * | 2/2021 | D06F 58/24 |
| JP | 2009-125208 | A | 6/2009 | |
| JP | 6871674 | B2 | 5/2021 | |
| KR | 20200137504 | A | 12/2020 | |
| KR | 102585025 | B1 * | 10/2023 | D06F 58/206 |
| WO | WO-2017119587 | A1 * | 7/2017 | D06F 58/206 |

* cited by examiner

LAUNDRY APPLIANCE WITH HEAT PUMP HAVING IMPROVED EVAPORATOR EFFICIENCY

FIELD

The present disclosure relates generally to laundry appliances and more particularly to an evaporator design for a heat pump for a front-load washer and dryer combination.

BACKGROUND

The statements in this section merely provide background information related to the present disclosure and may not constitute as prior art.

Laundry appliances (i.e., laundry machines, washing machines, and dryers) are prolific in both residential and commercial settings. Traditionally, separate washer and dryer machines have been used in tandem to clean and dry laundry. However, there is a growing market for washer and dryer combination appliances where a single machine performs both the washing and drying functions, thereby eliminating the need for two separate machines. There are a number of different names used to describe washer and dryer combination appliances, including without limitation, "washer/dryer combos" and "all-in-one washer dryers." While these units save space compared to separate washer and dryer machines, combining the washing and drying functions into a single appliance presents a number of engineering challenges.

Many washer and dryer combination appliances have a front-load appliance configuration, where the washer and dryer combination appliance includes a cabinet with a front opening that is accessed by a front-mounted appliance door. A drum is positioned in and is rotatable with respect to the cabinet. During tumbling, a motor housed within the cabinet rotates the drum. The drum typically has a front end with a drum opening that provides access to a laundry compartment inside the drum.

Washer and dryer combination appliances are gaining in popularity because they save space compared to a set of separate washer and dryer appliances and because they do not require the act of transferring laundry between separate appliances between the wash and drying cycles. This allows consumers to simply load laundry into the washer and dryer combination appliance and select the desired wash and drying cycle settings and they do not have to return again until the laundry is washed and dried. However, performing the drying cycle in the same appliance that performed the wash cycle presents a number of engineering challenges due to the presence of water inside the drum during the wash cycle and the resulting levels of humidity that remain inside the appliance during the drying cycle. Solutions that improve the performance and efficiency of the drying cycle in washer and dryer combination appliances in the face of these challenges are needed.

Heat pumps have been proposed to remove moisture from the drying air. A heat pump has an evaporator and a condenser. The air from the drum is passed through an evaporator which removes some of the moisture from the air. The evaporator, however, reduces in efficiency as moisture in the form of condensation droplets builds up on the fins of the evaporator. Likewise, because the air is coming from the drum, lint clings to the moisture droplet on the evaporator.

Improving the efficiency of an evaporator reduces the amount of energy used in the system.

SUMMARY

This section provides a general summary of the disclosure, and is not a comprehensive disclosure of its full scope or all of its features.

In accordance with one aspect of the present disclosure, a heat pump dryer includes a cabinet, a drum rotatably supported within the cabinet, a heat pump including a condenser and an evaporator that are arranged in fluid communication with each other and a floating base plate that is dynamically supported within the cabinet such that the floating base plate is permitted to oscillate relative to the cabinet. The vibration source and at least one of the evaporator and the condenser are mounted on the floating base plate such that operation of the vibration source causes the at least one of the evaporator and the condenser to vibrate and shake water condensate and debris from the at least one of the evaporator and the condenser for improved heat pump circuit efficiency.

Other features include the vibration source being at least one vibrator motor, the vibration source being a compressor that is connected in fluid communication with the heat pump, the heat pump further comprising an expansion valve, the evaporator, the condenser, the compressor, and the expansion valve form a fluid circuit, the floating base plate being coupled to the cabinet with a damper, the floating base plate being coupled to the cabinet with a plurality of dampers, and the heat pump being disposed beneath a drum within the cabinet. the heat pump dryer. The heat pump dryer may be included in a combination washer and dryer.

In another aspect of the disclosure, a heat pump dryer includes a cabinet, a drum housing positioned within the cabinet, a drum rotatably supported within the drum housing comprising at least one drum wall defining a laundry compartment therein and a drying air circulation path that extends from a drying air inlet positioned in the at least one drum wall to a drying air outlet positioned in fluid communication with the laundry compartment in the drum. A heat pump having an evaporator and a compressor are disposed within the drying air circulation path, said evaporators comprising a plurality of fins. Vibrators coupled fins to cause the evaporator to vibrate and shake water condensate and debris from the evaporator for improved heat pump circuit efficiency.

In another aspect of the disclosure, a condenser dryer includes a cabinet, a drum rotatably supported within the cabinet, a base supported within the cabinet, a condenser coupled to the base plate and a vibration source coupled to the condenser mounted to the base such that operation of the vibration source causes the condenser to vibrate and shake water condensate and debris from the condenser for improved heat pump circuit.

Other features of the condenser dryer include a blower motor coupled to the base, the vibration source comprising an unbalanced motor or a vibrator, wherein the vibrator may comprise an unbalanced motor, a plurality of unbalanced motors or an array of unbalanced motors.

Advantageously, the condensing systems described herein improve the drying performance of the washer and dryer combination laundry appliance by reducing the humidity of the air inside the laundry compartment, which is heated and recirculated during a drying cycle. Improved drying performance is realized because warm dry air provides better drying performance than warm moist air. In addition, the evaporator of the heat pump has lint and dirt removed using vibration to make the system more energy efficient.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
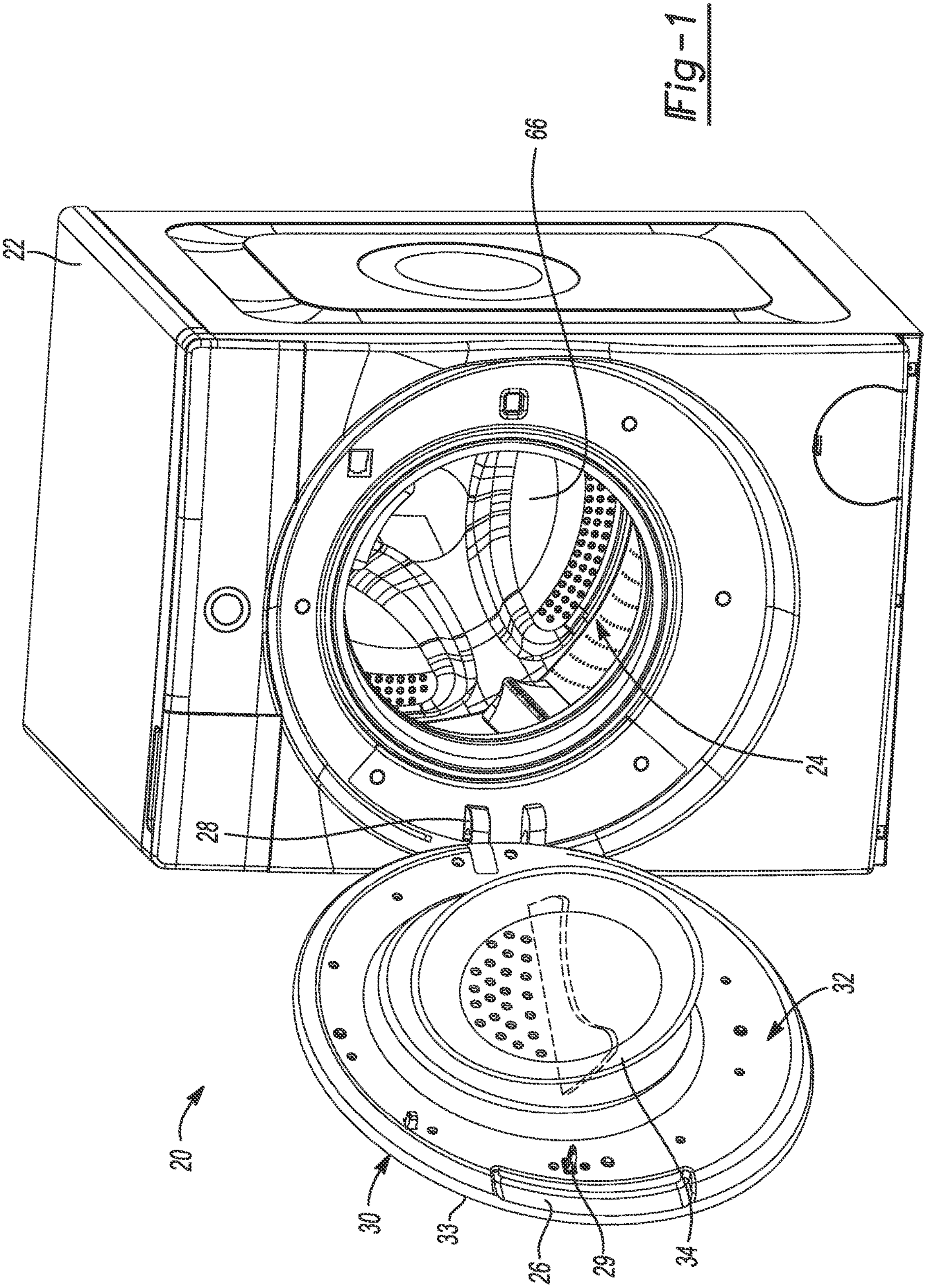
FIG. 1 is a front perspective view of an exemplary washer and dryer combination laundry appliance that has been constructed in accordance with one aspect of the present disclosure.

Referring to the Figures, wherein like numerals indicate corresponding parts throughout the several views, various aspects of a washer and dryer combination laundry appliance 20 are illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

For purposes of description herein the terms "up," "down," "above," "below," "upper," "lower," "top," "bottom," "front," "rear," and derivatives thereof shall relate to the assembly as oriented in FIGS. 1-6B. However, it is to be understood that the apparatus and assemblies described herein may assume various alternative orientations. Finally, the term "substantially" as used herein describes angles and/or orientations that can vary plus or minus five degrees from the referenced direction, axis, plane, or orientation.

Figure 2:
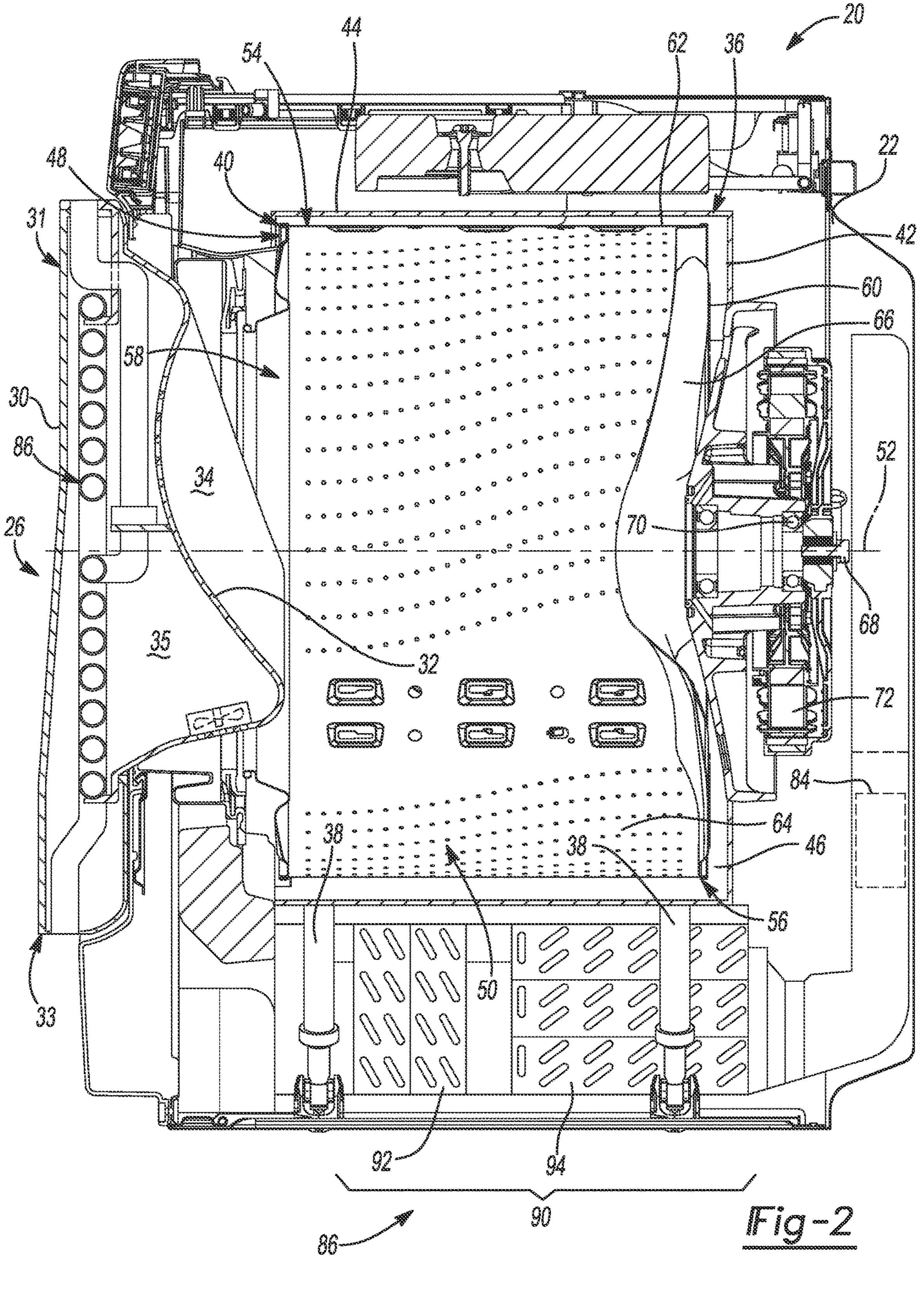
FIG. 2 is a side cross-section view of the exemplary washer and dryer combination laundry appliance shown in FIG. 1.
Figure 3:
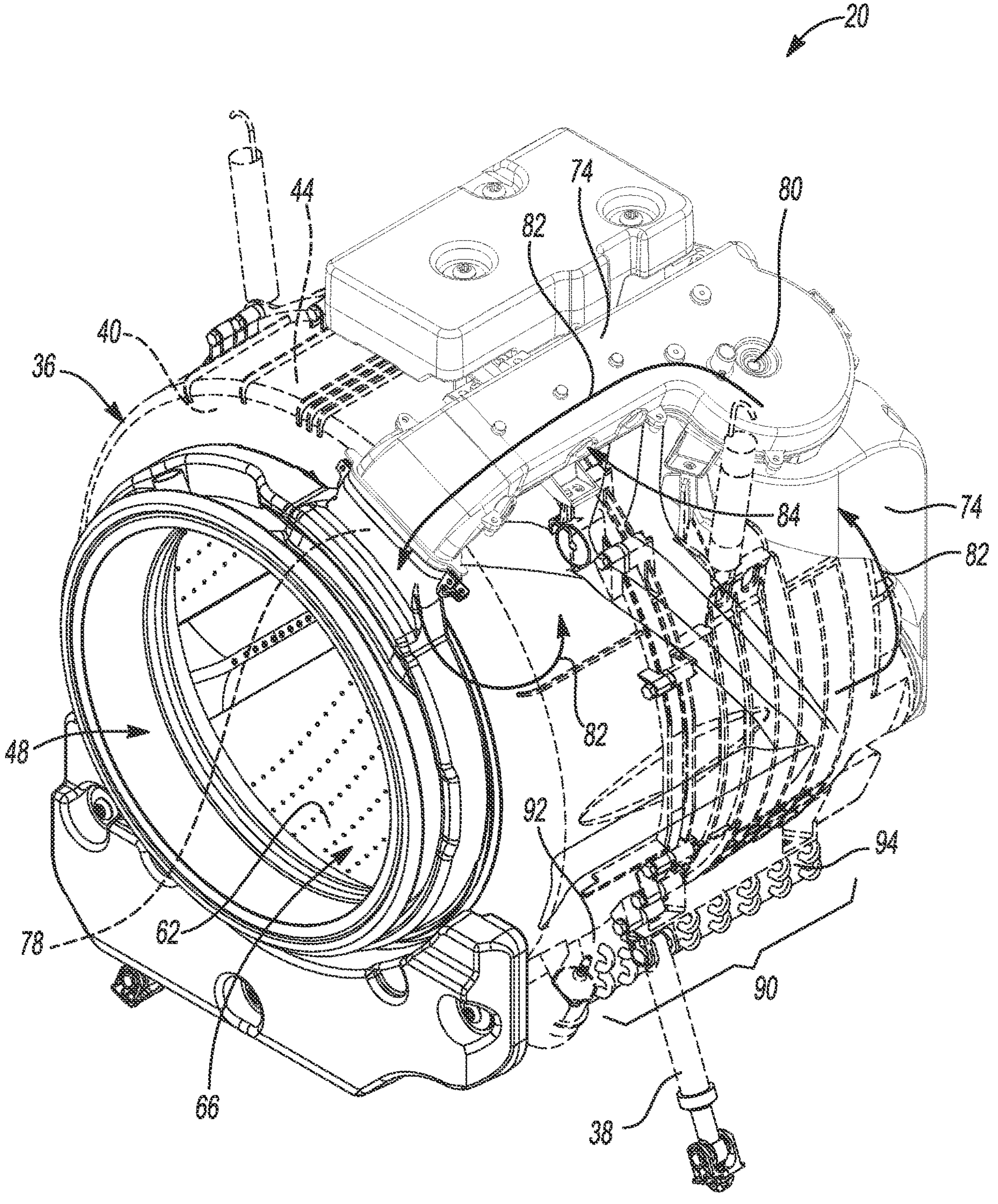
FIG. 3 is a side isometric view of the exemplary washer and dryer combination laundry appliance shown in FIG. 1, where certain components of the laundry appliance have been made transparent and/or converted to dashed lines for illustration purposes.

With reference to FIGS. 1-3, a laundry appliance 20 having a front-load configuration is illustrated. The laundry appliance 20 may be condenser dryer or a combination washer and dryer. The laundry appliance 20 includes a cabinet 22 that is rectangular in shape and that includes a front opening 24. A front appliance door 26 is pivotally connected to the laundry appliance 20. The front appliance door 26 swings between an open position and a closed position. In the closed position, the front appliance door 26 shuts or closes the front opening 24 in the cabinet 22. Although other configurations are possible, in the illustrated example, the front appliance door 26 is pivotally mounted to the front of the cabinet 22 by a hinge 28 and held in the closed position during wash and drying cycles by a latch 29.

The front appliance door 26 includes an outer wall 30 that presents an outer door surface 31, which faces out away from the front opening 24 in the cabinet 22 when the front appliance door 26 is in the closed position and an inner wall 32 that faces the front opening 24 in the cabinet 22 when the front appliance door 26 is in the closed position. The front appliance door 26 also includes a door perimeter 33 and a bowl 34. The door perimeter 33 is configured to abut the cabinet 22 when the front appliance door 26 is in the closed position. The bowl 34 is provided on the inner wall 32 of the front appliance door 26 and is spaced radially inward of the door perimeter 33. At least a portion of the bowl 34 is received in the front opening 24 in the cabinet 22 when the front appliance door 26 is in the closed position. Among other functions, the bowl 34 prevents laundry inside the laundry appliance 20 from accumulating in the front opening 24 during tumbling and particularly during the wash cycle of the laundry appliance 20. Although other materials can be used, in the illustrated example, the front appliance door 26 is made of metal, while the bowl 34 is made of a molded plastic material.

The laundry appliance 20 includes a drum housing 36 with a cylindrical shape that is mounted inside the cabinet 22 on dynamic mounts 38, which keep the drum housing 36 from rotating, but permit limited degrees of freedom that allow the drum housing 36 to move/oscillate relative to the cabinet 22 during tumbling. The drum housing 36 includes a front ring 40, a rear drum housing wall 42, and a drum housing sidewall 44 that extends longitudinally from the front ring 40 to the rear drum housing wall 42 to define a drum housing cavity 46 inside the drum housing 36. The front ring 40 of the drum housing 36 includes a drum housing opening 48 positioned in at least partial alignment with the front opening 24 in the cabinet 22.

A drum 50 is positioned in the drum housing cavity 46 and is supported therein such that the drum 50 is rotatably coupled with respect to the drum housing 36 about a longitudinal axis 52. The drum 50 also has a cylindrical shape and extends longitudinally between a front drum end 54 and a rear drum end 56. The drum 50 includes a drum opening 58 at the front drum end 54, a rear drum wall 60 at the rear drum end 56, and a drum sidewall 62 that extends longitudinally between the front drum end 54 and rear drum end 56. The drum sidewall 62 includes an outer surface 64 that faces the drum housing sidewall 44. The front drum end 54, the drum sidewall 62, and the rear drum wall 60 cooperate to define a laundry compartment 66 inside the drum 50. The front opening 24 in the cabinet 22, the drum housing opening 48 in the front ring 40 of the drum housing 36, and the drum opening 58 at the front drum end 54 are at least partially aligned with one another and therefore provide access to the laundry compartment 66 inside the drum 50 when the front appliance door 26 is in the open position. Thus, it should be appreciated that in use, laundry (e.g., clothes, towels, and/or bedding, etc.) is placed inside the laundry compartment 66 where it is first cleaned during the wash cycle and then dried during the drying cycle of the laundry appliance 20.

A drive shaft 68, fixedly coupled to the rear drum end 56, is supported by a bearing pack 70 such that the drive shaft 68 and the drum 50 rotate together as a single unit within the cabinet 22. An electric motor 72, positioned in the cabinet 22, operates to drive rotation of the drive shaft 68, which in turn drives rotation of the drum 50 within the drum housing 36 and the cabinet 22 during operation of the laundry appliance 20, such as during washing and tumbling.

As best seen in FIG. 3, the laundry appliance 20 includes a drying air circulation duct 74, which is mounted inside the cabinet 22. The drying air circulation duct 74 includes a duct inlet 76 and a duct outlet 78 that are arranged in fluid communication with the laundry compartment 66. A drying air circulation fan 80 is mounted inside the drying air circulation duct 74. During a drying cycle of the laundry appliance 20, the drying air circulation fan 80 pulls air in the laundry compartment 66 in through the duct inlet 76 and pushes air out through the duct outlet 78 to define a drying air circulation flow path 82 through the drying air circulation duct 74. A heater 84 is also positioned inside the drying air circulation duct 74. Although other configurations are possible, the heater 84 may be an electric resistance heater, for example. During one or more portions of the drying cycle, the heater 84 operates to heat the air inside the drying air circulation duct 74 upstream of the duct outlet 78. When the heater 84 is activated, the temperature of the air expelled into the laundry compartment 66 from the duct outlet 78 is warmer (i.e., is at a higher temperature) than the air that is pulled into the drying air circulation duct 74 through the duct inlet 76. The circulation and heating of air performed by the drying air circulation duct 74 during a drying cycle of the laundry appliance 20 dries the laundry in the laundry compartment 66 as it tumbles within the rotating drum 50. However, as the laundry dries, the air inside the laundry compartment 66 that is re-circulated through the drying air circulation duct 74 becomes very humid (i.e., moist).

Figure 4A:
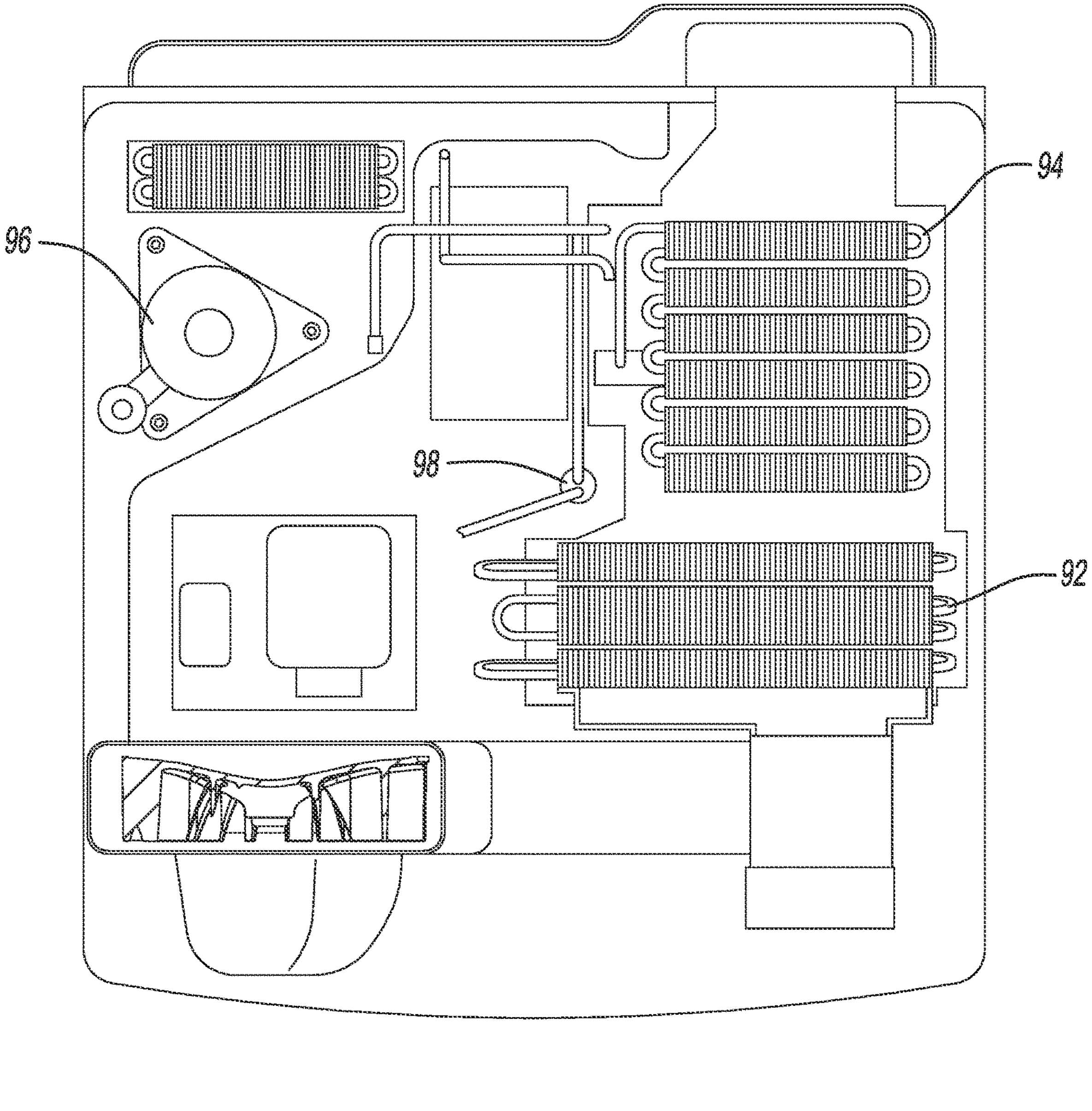
FIG. 4A is a top view of the heat pump of FIG. 2.
Figure 4B:
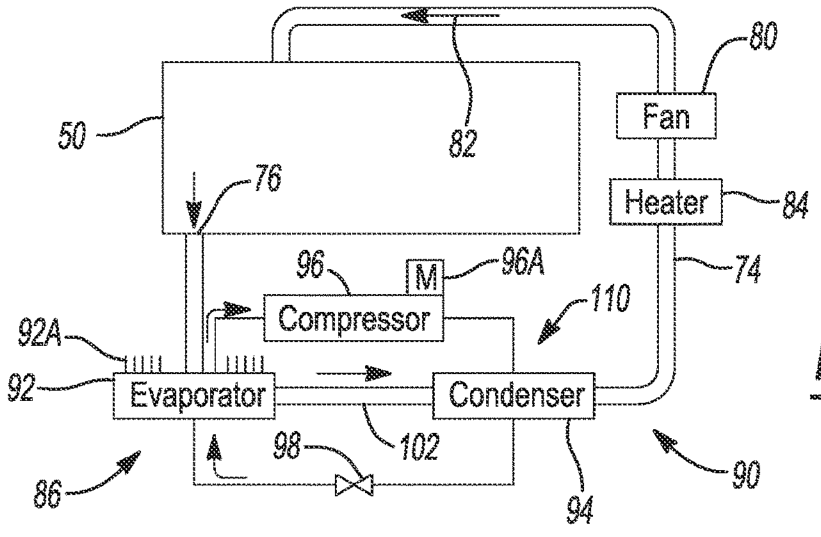
FIG. 4B is a schematic view of the heat pump in communication with the air flow through the ducts.

Referring now also to FIGS. 4A and 4B, to improve the drying performance, the laundry appliance 20 includes a condensing system 86 as is illustrated in FIG. 4B schematically. As shown in FIG. 4B, a top view of the condensing system 86 is set forth. The condensing system 86 has a heat pump 90 that has an evaporator 92 and a condenser 94. FIGS. 2 and 3 show the position of the evaporator 92 and the condenser 94 relative to the drum housing 36. However, other positions of the heat pump 90 and the condensing system 86 may be used.

The heat pump 90 also includes a compressor 96 and an expansion valve 98. The flow path 82 through the heat pump 90 and the drum 50 form a continuous loop. Air from the inlet 76 is communicated to the evaporator 92. The evaporator 92 is lower in temperature and therefore moisture from the drum 50 condenses on the evaporator 92 to form water droplets. Debris such as lint also collects on the evaporator 92. The evaporator 92 communicates the air to the condenser 94 through a duct 102. The duct 102 may be a mere path between an evaporator 92 and the condenser 94. Heat from the condenser 94 is absorbed in the air flow path. The air from condenser 94 is communicated through the duct 74 to the heater 84 and the fan 80. The heater 84 and fan 80 may be reversed in order.

The evaporator 92 has an evaporation improvement device such as fins 92A or microchannels extending therefrom or incorporated therein. The evaporation improvement device such as fins 92A increases the surface area of the evaporation coil 92.

The evaporator 92 and the condenser 94 have a fluid circuit 110. The compressor 96 compresses the refrigerant or heat transfer fluid evaporated in the evaporator 92 to create a high temperature and high pressure refrigerant. The condenser 94 moves the high temperature and high pressure refrigerant to the expansion valve 98. Heat from the condenser 94 is imparted into the air passing through the condenser 94. The expansion valve 98 expands the refrigerant condensed in the condenser 94 to make low temperature low pressure refrigerant that is communicated to the evaporator 92. Ultimately, the refrigerant or heat transfer fluid is communicated back to the compressor 96 in the fluid circuit.

Figure 5:
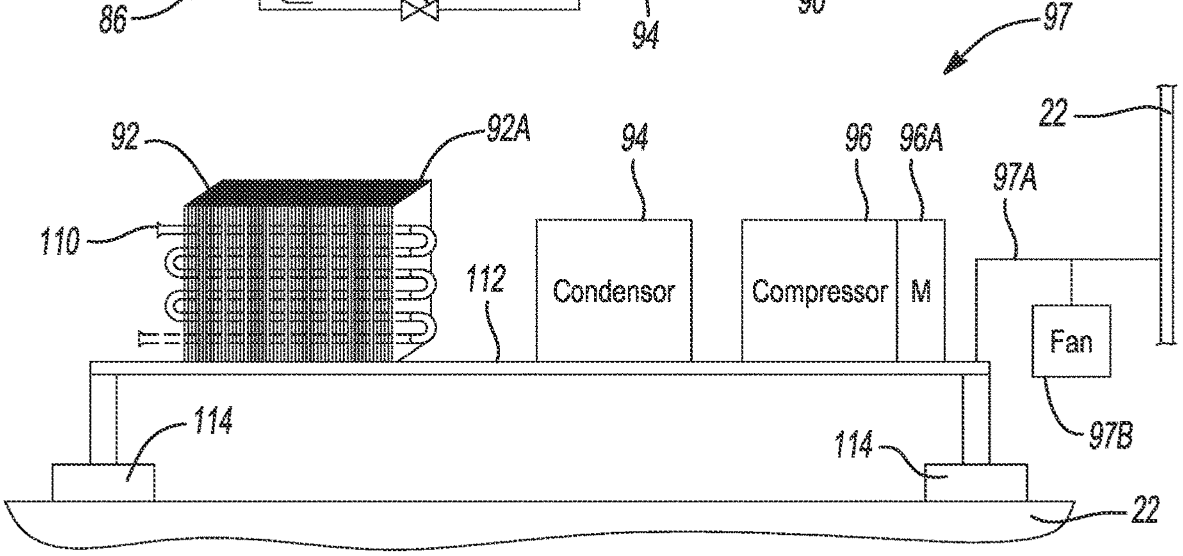
FIG. 5 is a first example of a vibrating source mounted to a floating base plate.

Referring now to FIG. 5, as mentioned above, the evaporator 92 has fins 92A that are used for heat transfer of the fluid within the fluid circuit 110, a portion of which is shown in FIG. 5. In this example, the evaporator 92 is mounted to a floating base plate 112. The floating base plate 112 dynamically supports the evaporator 92 within the cabinet and is permitted to oscillate or vibrate relative to the cabinet 22, a portion of which is illustrated. Dampers 114 couple the floating base plate 112 to the cabinet 22. By providing the dampers 114, the vibrations at the floating base plate 112 are not communicated to the cabinet 22 so the vibrations are not sensed by the operator of the laundry appliance 20.

The compressor 96 has a motor 96A. The motor 96A of the compressor 96 imparts vibration onto the floating base plate 112 and acts as a vibration source 97. Because the evaporator 92 and the compressor 96 are both fixed to the floating base plate 112, the vibrations from the compressor 96 cause the evaporator to oscillate or vibrate to shake condensate and lint debris from the evaporator 92. The cleaner evaporator 92 exposes more surface area to the airflow and improves the energy efficiency of the heat pump 90. Other vibration sources 97 may include a link 97A coupled to the cabinet 22. through a link 97A to couple vibrations to the evaporator directly or through the base plate 112. A blower fan 97B may also be used as the vibration source 97. The blower fan 97B may be mounted on the plate 112 or coupled thereto by the link 97A as illustrated.

The vibrations from the vibration source 97 may be applied in transverse or longitudinal directions (or as a combination thereof). The amplitude, frequency, phase, and type of the vibration signal may vary based on the performance of the product. The parameters are subject to variability depending on the architecture of the appliance.

Figure 6A:
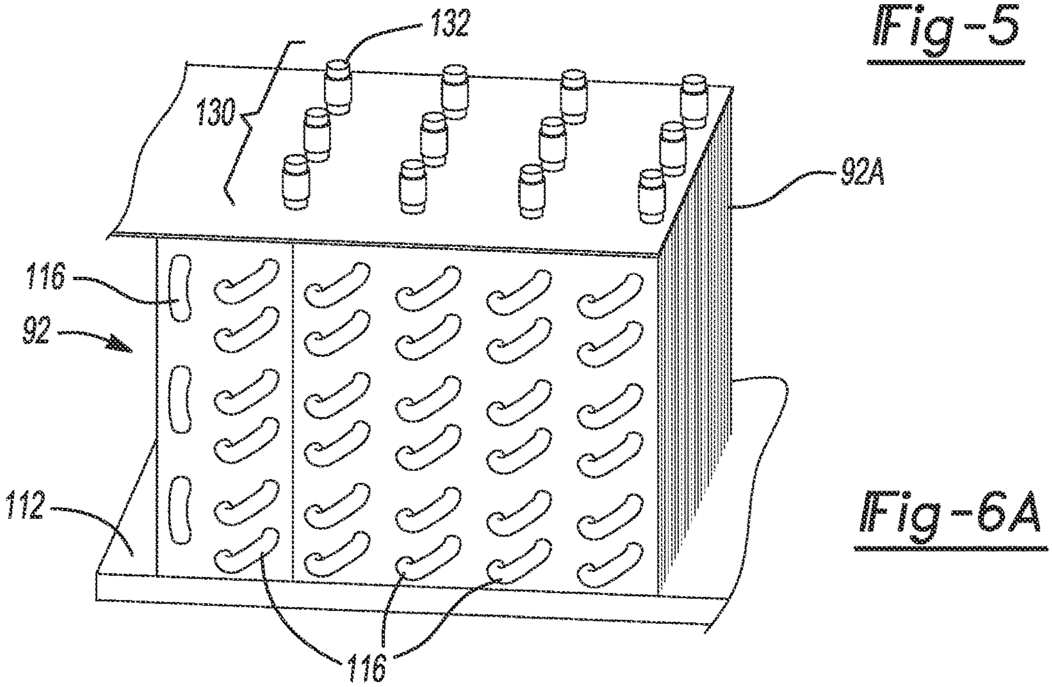
FIG. 6A is a perspective view of a motor coupled to a fin of the evaporator.

Referring now to FIG. 6A, an enlarged detailed view of the evaporator 92 is set forth. The evaporator 92, as mentioned above, has fins 92A and a plurality of coils 116. The fluid from the fluid circuit 110 is communicated through the coils 116. The cool fluid within the coils 116 cools the fins 92A to allow air circulating through the evaporator 92 to cool as well. As mentioned above, the coolness of the fins 92A allow condensate droplets to form on the fins.

In this example, regularly spaced vibrators 132 are coupled to the fins 92A. In this example, the array 130 is a 4×3 array. The vibrators 132 are a vibration source. That is, three rows of four vibrators 132 are provided in the array 130. The vibrators 132 may be disposed against the fins 92A. The vibrators 132 may be affixed to the fins 92A as well. Fasteners 144 shown in 6B, welding or adhesives may be used to fasten the vibrators 232 to the fins 92A.

Figure 6B:
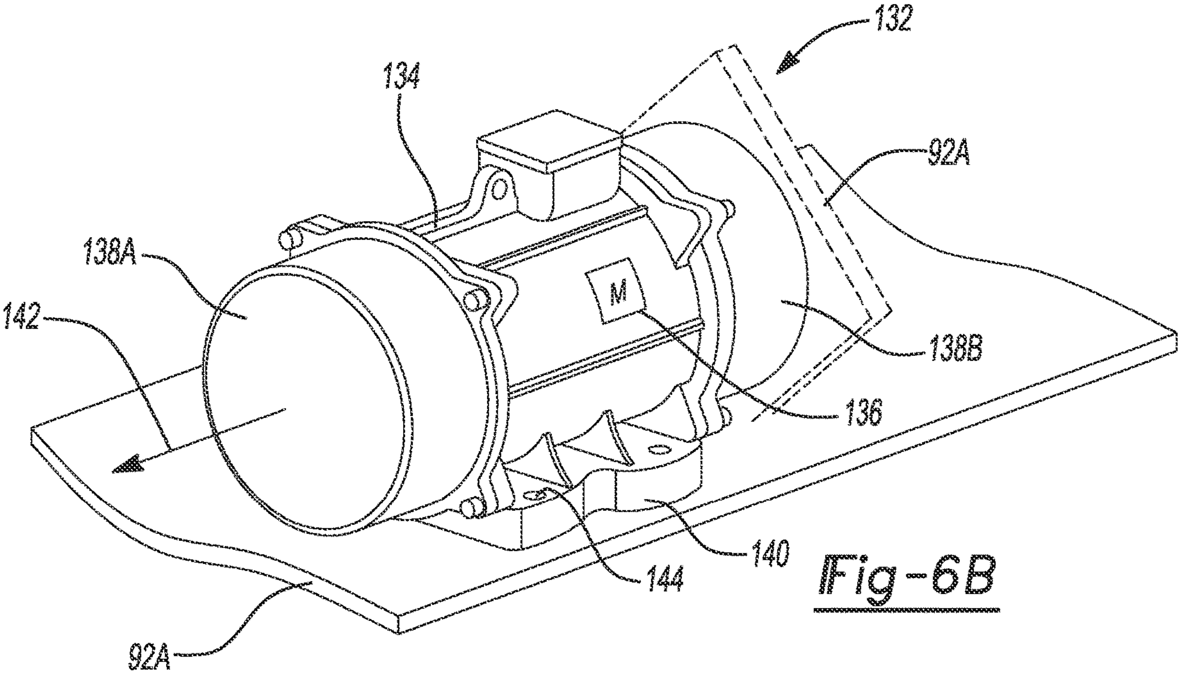
FIG. 6B is a perspective view of a motor for vibrating the fins of the evaporator.

Referring now to FIG. 6B, details of the vibrator 132 are set forth. The vibrator 132 has a motor housing 134 that has a motor 136 disposed therein. The motor 136 rotates within the housing 134 and vibrates the vibrator 132. The motor housing 134 has at least one vibrating surface 138A and 138B. That is, in this example, two vibrating surfaces 136A and 136B are illustrated. The base 140 is mounted to fins 92A so that motor 136 imparts vibration to the fins 92A. The vibratory surfaces 138A, 138B, may also be mounted against the fins 92A as illustrated in dashed lines. The end of the fins 92A may be coupled to or against particular an end of the fins 92A as illustrated in FIG. 6A so that a longitudinal axis 142 of the vibrators 132 are aligned parallel with the fins 92A as illustrated in FIG. 6A to allow one of the vibratory surfaces to touch the edge of a fin 92A.

Figure 6C:
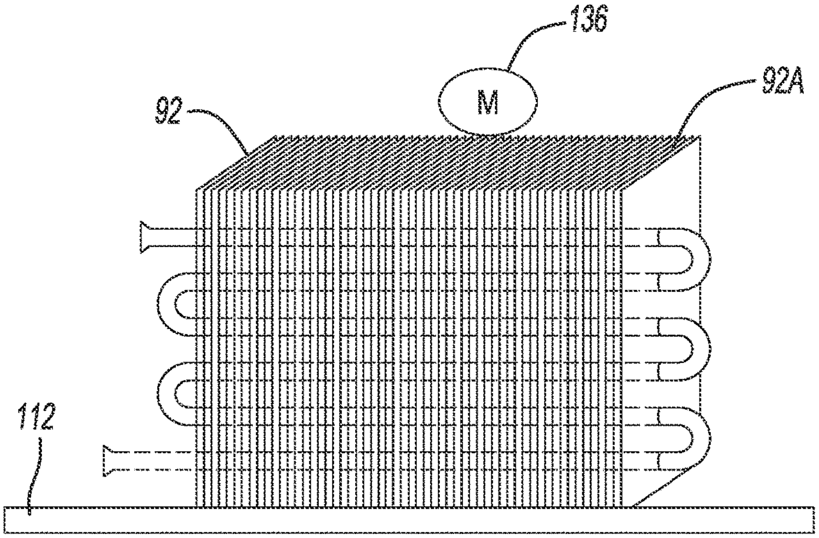
FIG. 6C is a perspective view of a motor.

Referring now to FIG. 6C, the vibratory motor 136 is illustrated adjacent to the fins 92A. One motor 136 is illustrated adjacent the fins 92A. As mentioned above in FIG. 6A, an array 130 of motors 136 may be used. However, in FIG. 6C, one motor may provide enough vibration of the evaporator 92.

In FIGS. 6A and 6C, the evaporator 92 may be mounted to the floating base plate 112. Dampers as illustrated in FIG. 5 may be isolate the floating base plate 112 from the cabinet of the laundry appliance as described above.

Figure 7A:
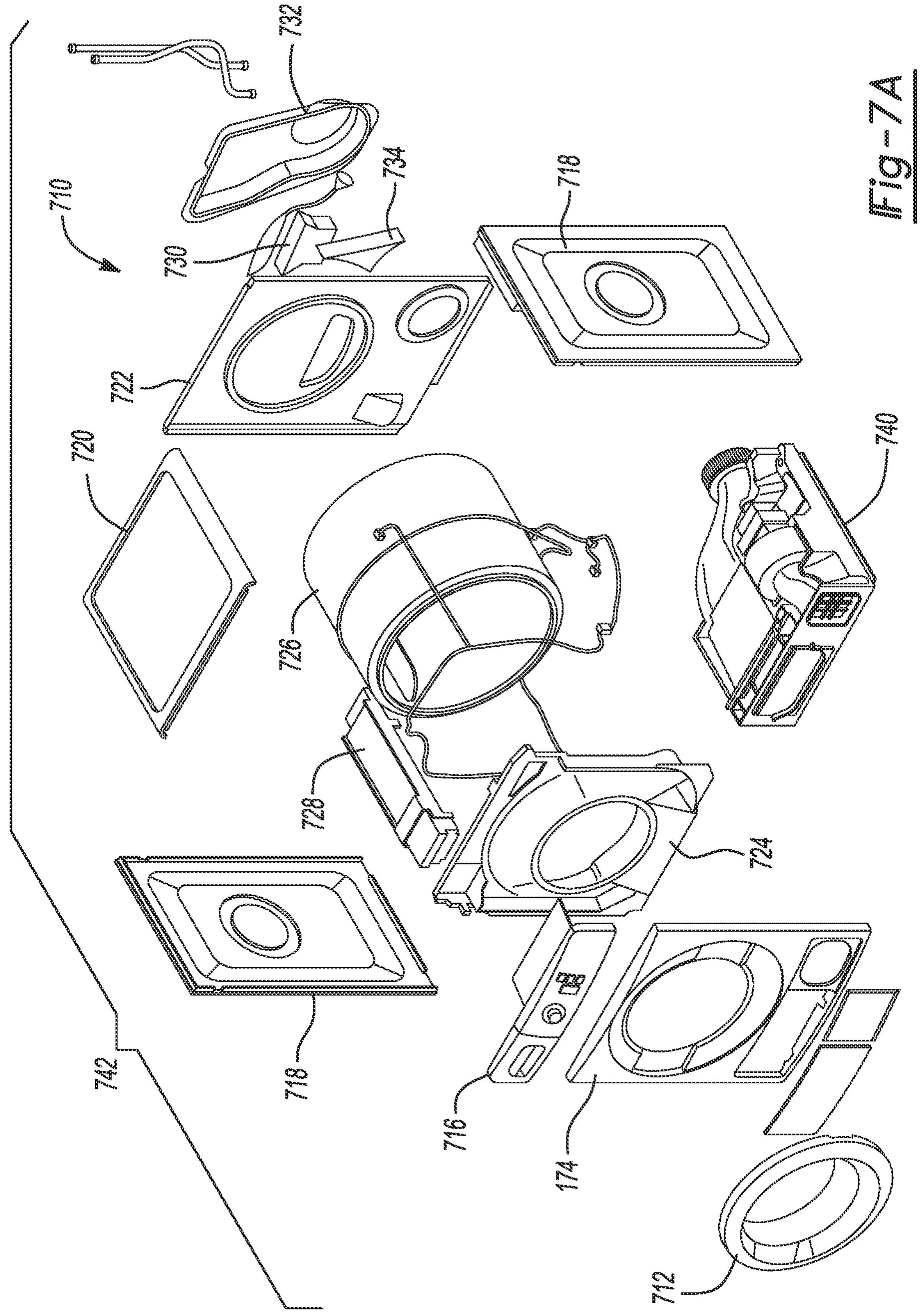
FIG. 7A is an exploded view of a condenser dryer.
Figure 7B:
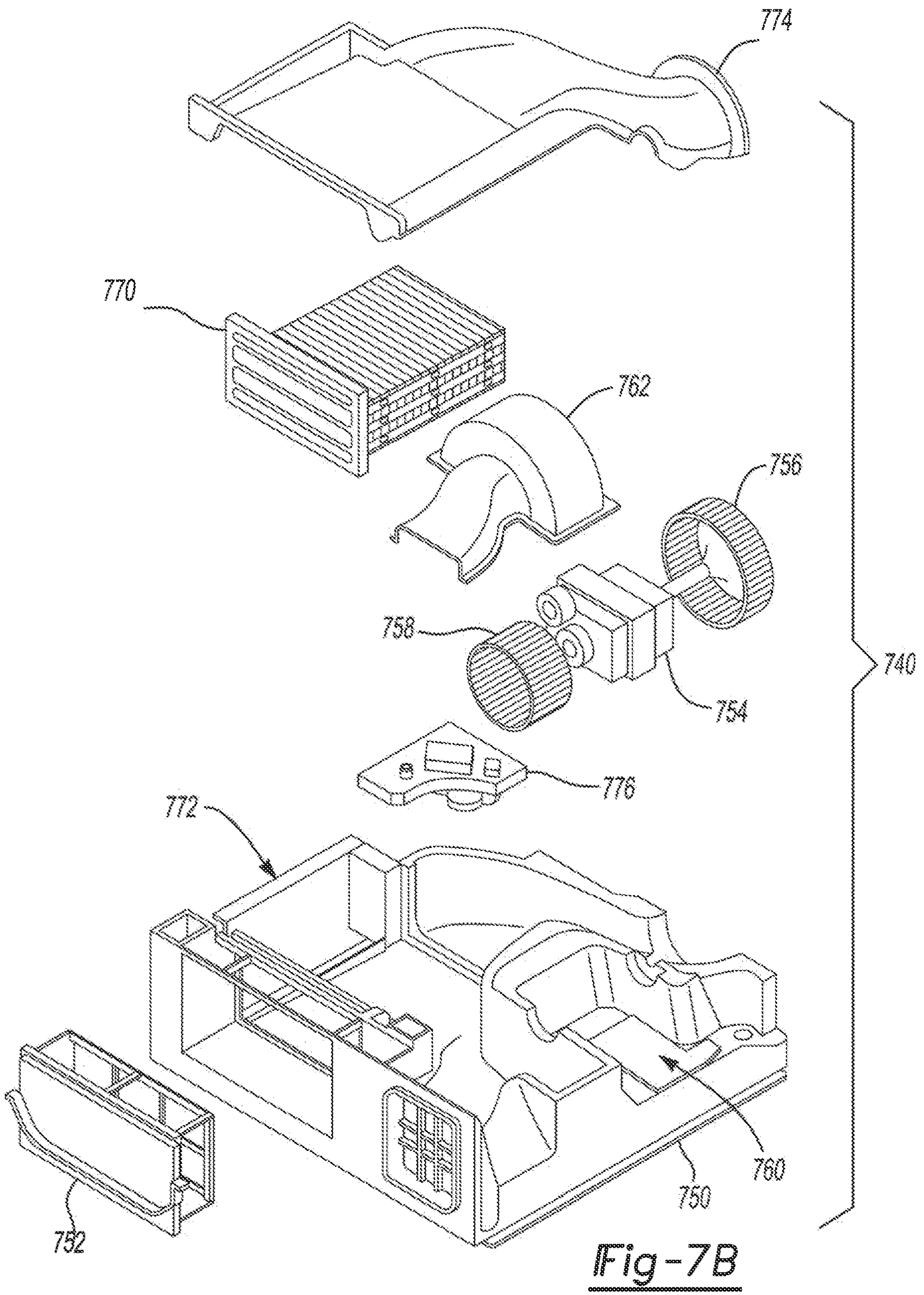
FIG. 7B is an exploded view of the base assembly of the condenser dryer.

Referring now to FIGS. 7A and 7B, the present disclosure also applies to a condenser dryer 710. FIG. 7A illustrates an exploded view of a condenser dryer. The condenser dryer 710 has a door 712 coupled to a front panel 714. The front panel is located adjacent to a console 716. A pair of side panels 718, a top panel 720 and a rear panel 722 enclose the condenser dryer 710 to form a housing 742. An air channel 724 is used to circulate air into a drum 726. A water bottle and cradle 728 are also disposed adjacent to the drums 726.

A heater assembly 730 is coupled to the rear panel 722 to provide a heating source for the drum 726. A cover 732 is used to cover the heating assembly. A scroll 734 is also coupled to the rear panel 722.

A base assembly 740 is disposed below the drum 726 within a housing 742 formed by the front panel 714, the side panel 718, the top panel 720 and the rear panel 722.

Referring now to FIG. 7B, the base assembly 740 is illustrated in further detail. The base assembly 740 includes a base 750 that has a front cover assembly 752 disposed thereon. The base assembly is used to house a motor 754 that is used to operate a blower 756 and a cooling blower wheel 758. The motor 754, the blower 756 and the cooling blower wheel 758 are disposed in a cavity 760 within the base 750. The motor 754 may provide a vibration source. The cavity 760 may be enclosed by a cooling fan cover 762. A condenser 770 may also be disposed within the base assembly 740. In particular, the condenser 770 may be located in a condenser cavity 772 of the base 750 and have fins. The base 740 may also include a cover 774 to cover the units disposed therein. Further, a sump 776 may be used to pump water from the system. Dampers as illustrated in FIG. 5 may be isolate the base assembly 740 from the cabinet of the laundry appliance as described above.

Figure 7C:
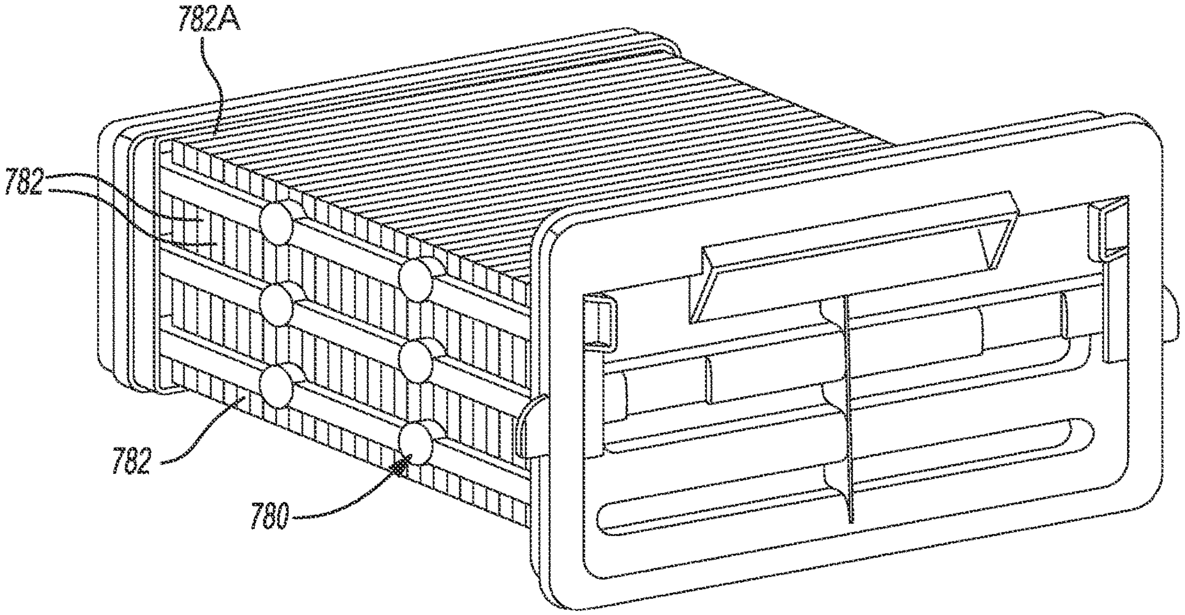
FIG. 7C is a perspective view of the condenser dryer.
Figure 7D:
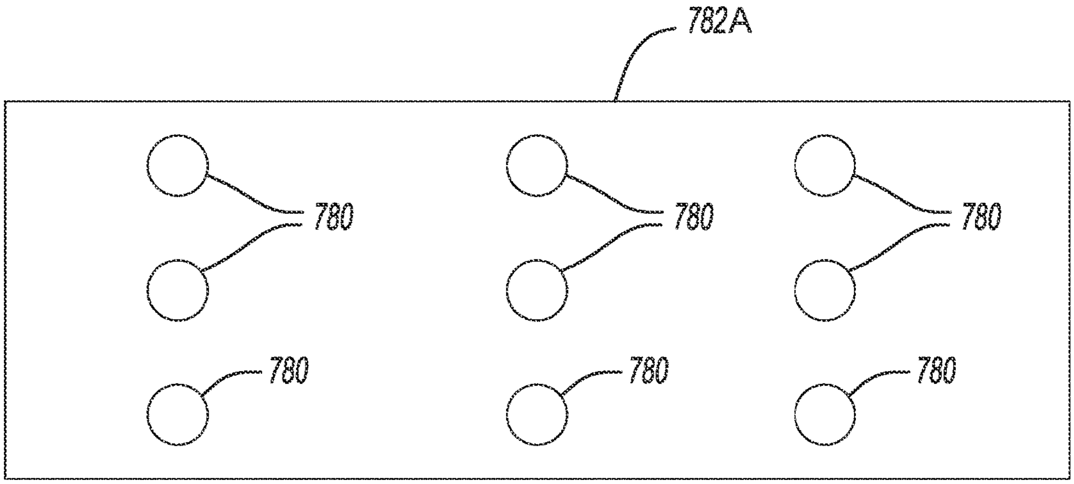
FIG. 7D is a top elevational view of a plurality of vibration sources attached to a condenser.

Referring now to FIG. 7C, a perspective view of the condenser 770 is illustrated. The condenser 770 may have a plurality of vibrators 780 coupled thereto. The vibrators 780 may be located or arranged in arrays that are disposed between layers 782A of fins 782 of the condenser 770. In FIG. 7D, one layer 782A of fins 782 is illustrated having nine vibrators 780. However, various numbers of vibrators may be used. Although the motor 754 may provide a vibrating source, the vibrator 780 may achieve further vibration to clear the condensing coils from the condensation and lint disposed thereon. The vibrators 780 may be vibrating motors such as those illustrated in FIG. 6B. In FIG. 6B, the motor may be unbalanced to provide a vibration source.

Many modifications and variations of the apparatus and assemblies described in the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A heat pump dryer, comprising:
- a cabinet;
- a drum rotatably supported within the cabinet;
- a heat pump including a condenser and an evaporator that are arranged in fluid communication with each other; and
- a floating base plate that is dynamically supported within the cabinet such that the floating base plate is permitted to oscillate relative to the cabinet, wherein a vibration source and at least one of the evaporator and the condenser are mounted on the floating base plate such that operation of the vibration source causes the at least one of the evaporator and the condenser to vibrate and shake water condensate and debris from the at least one of the evaporator and the condenser for improved heat pump circuit efficiency.

2. The heat pump dryer of claim 1 wherein the vibration source is at least one vibrator motor.

3. The heat pump dryer of claim 1 wherein the vibration source is a compressor that is connected in fluid communication with the heat pump.

4. The heat pump dryer of claim 3 wherein the heat pump further comprises an expansion valve.

5. The heat pump dryer of claim 4 wherein the evaporator, the condenser, the compressor, and the expansion valve form a fluid circuit.

6. The heat pump dryer of claim 1 wherein the floating base plate is coupled to the cabinet with a damper.

7. The heat pump dryer of claim 1 wherein the floating base plate is coupled to the cabinet with a plurality of dampers.

8. The heat pump dryer of claim 1 wherein the heat pump is disposed beneath a drum within the cabinet.

9. A combination washer and dryer comprising the heat pump dryer of claim 1.

10. The heat pump dryer of claim 1 wherein the vibration source comprises the cabinet coupled to the evaporator through a link.

11. The heat pump dryer of claim 1 wherein the vibration source comprises a blower fan coupled to the evaporator through a link.

12. A heat pump dryer, comprising:

a cabinet;

a drum housing positioned within the cabinet;

a drum rotatably supported within the drum housing comprising at least one drum wall defining a laundry compartment therein;

a drying air circulation path that extends from a drying air inlet positioned in the at least one drum wall to a drying air outlet positioned in fluid communication with the laundry compartment in the drum;

a heat pump comprising an evaporator and a compressor disposed within the drying air circulation path, said evaporator comprising a plurality of fins; and vibrators coupled to the fins to cause the evaporator to vibrate and shake water condensate and debris from the evaporator for improved heat pump circuit efficiency.

13. The heat pump dryer of claim 12 wherein the vibrators comprise a plurality of vibrators coupled to the fins.

14. The heat pump dryer of claim 13 wherein the heat pump further comprises an expansion valve.

15. The heat pump dryer of claim 14 wherein the evaporator, the condenser, the compressor, and the expansion valve form a fluid circuit.

16. The heat pump dryer of claim 12 wherein the vibrators comprise a plurality of motors disposed in an array and coupled to the fins.

17. The heat pump dryer of claim 16 wherein the plurality of motors each comprise a vibratory surface coupled to at least one of the plurality of fins.

18. The heat pump dryer of claim 12 wherein the evaporator is coupled to a floating base plate that is dynamically supported within the cabinet such that the floating base plate is permitted to oscillate relative to the cabinet.

19. The heat pump dryer of claim 18 wherein the floating base plate is coupled to the cabinet with a damper.

20. The heat pump dryer of claim 18 wherein the floating base plate is coupled to the cabinet with a plurality of dampers.

21. The heat pump dryer of claim 12 further comprising a heater and fan positioned within the drying air circulation path.

22. A combination washer and dryer comprising the heat pump dryer of claim 12.

23. A condenser dryer comprising:

a cabinet;

a drum rotatably supported within the cabinet;

a base supported within the cabinet;

a condenser coupled to the base; and a vibration source coupled to the condenser mounted to the base such that operation of the vibration source causes the condenser to vibrate and shake water condensate and debris from the condenser for improved heat pump circuit efficiency.

24. The condenser dryer of claim 23 further comprising a blower motor coupled to the base.

25. The condenser dryer of claim 23 wherein the vibration source comprises an unbalanced motor.

26. The condenser dryer of claim 23 wherein the vibration source comprises a vibrator.

27. The condenser dryer of claim 26 wherein the vibrator comprises an unbalanced motor.

28. The condenser dryer of claim 23 wherein the vibration source comprises a plurality of unbalanced motors.

29. The condenser dryer of claim 23 wherein the vibration source comprises an array of unbalanced motors.

* * * * *